United States Patent
Roper et al.

(10) Patent No.: US 6,484,107 B1
(45) Date of Patent: Nov. 19, 2002

(54) SELECTABLE ON-OFF LOGIC MODES FOR A SENSOR MODULE

(75) Inventors: Weston Roper, St. Louis Park, MN (US); Richard L. Nelson, Chanhassen, MN (US); Dale S. Davis, Prior Lake, MN (US)

(73) Assignee: Rosemount Inc., Eden Prairie, MN (US)

( * ) Notice: Subject to any disclaimer, the term of this patent is extended or adjusted under 35 U.S.C. 154(b) by 0 days.

(21) Appl. No.: 09/519,781

(22) Filed: Mar. 7, 2000

Related U.S. Application Data
(60) Provisional application No. 60/156,369, filed on Sep. 28, 1999.

(51) Int. Cl.$^7$ ............................................. G06F 19/00
(52) U.S. Cl. ............................................................. 702/50
(58) Field of Search .............................. 702/50, 52, 55, 702/104; 73/40, 149, 290 R (56) References Cited

U.S. PATENT DOCUMENTS

| | | | |
|---|---|---|---|
| 3,701,280 A | 10/1972 | Stroman | 73/194 |
| 3,968,694 A | 7/1976 | Clark | 73/398 |
| 4,120,206 A | 10/1978 | Rud, Jr. | 73/718 |
| 4,125,027 A | 11/1978 | Clark | 73/724 |
| 4,238,825 A | 12/1980 | Geery | 364/510 |
| 4,250,490 A | 2/1981 | Dahlke | 340/870.37 |
| 4,287,501 A | 9/1981 | Tominaga et al. | 338/42 |
| 4,414,634 A | 11/1983 | Louis et al. | 364/510 |
| 4,419,898 A | 12/1983 | Zanker et al. | 73/861.02 |
| 4,446,730 A | 5/1984 | Smith | 73/301 |
| 4,455,875 A | 6/1984 | Guimard et al. | 73/708 |
| 4,485,673 A | 12/1984 | Stern | 73/304 |
| 4,528,855 A | 7/1985 | Singh | 73/721 |
| 4,562,744 A | 1/1986 | Hall et al. | 73/861.02 |
| 4,598,381 A | 7/1986 | Cucci | 364/558 |
| 4,602,344 A | 7/1986 | Ferretti et al. | 364/509 |
| 4,617,607 A * | 10/1986 | Park et al. | 361/283.4 |
| D287,827 S | 1/1987 | Broden | D10/46 |
| 4,644,797 A | 2/1987 | Ichikawa et al. | 73/706 |
| 4,653,330 A | 3/1987 | Hedtke | 73/756 |
| 4,677,841 A | 7/1987 | Kennedy | 73/30 |
| 4,745,810 A | 5/1988 | Pierce et al. | 73/706 |
| D296,995 S | 8/1988 | Lee | D10/46 |
| D297,314 S | 8/1988 | Hedtke | D10/46 |
| D297,315 S | 8/1988 | Pierce et al. | D10/85 |
| 4,783,659 A | 11/1988 | Frick | 340/870.37 |
| 4,791,352 A | 12/1988 | Frick et al. | 324/60 |
| 4,798,089 A | 1/1989 | Frick et al. | 73/706 |
| 4,818,994 A | 4/1989 | Orth et al. | 340/870.21 |
| 4,825,704 A | 5/1989 | Aoshima et al. | 73/861.42 |

(List continued on next page.)

FOREIGN PATENT DOCUMENTS

| | | |
|---|---|---|
| DE | 37 41 648 A1 | 7/1988 |
| DE | 91 09 176.4 | 10/1991 |
| DE | 197 45 244 A1 | 4/1998 |

(List continued on next page.)

OTHER PUBLICATIONS

U.S. patent application Ser. No. 09/671,495, Behm et al., filed Sep. 27, 2000.

(List continued on next page.)

*Primary Examiner*—Judy Nguyen
(74) *Attorney, Agent, or Firm*—Westman, Champlin & Kelly, P.A.

(57) ABSTRACT

A sensor module has an outer module housing with an fluid inlet and a feedthrough with five electrical contacts. A transducer circuit in the module has a sensor connected to the inlet, a regulator connected to contacts 1, 2 and a transceiver providing a serial output to contact 3. A logic circuit is selectable to a first mode of operation in which the logic circuit generates ON-OFF logic levels on contacts 4, 5 or it can be selected to a second mode of operation in which the logic circuit detects ON-OFF logic levels on the contacts 4, 5.

16 Claims, 6 Drawing Sheets

U.S. PATENT DOCUMENTS

| | | | |
|---|---|---|---|
| 4,833,922 A | 5/1989 | Frick et al. ............... | 73/756 |
| 4,850,227 A | 7/1989 | Luettgen et al. .......... | 73/708 |
| 4,866,989 A | 9/1989 | Lawless ..................... | 73/756 |
| 4,881,412 A | 11/1989 | Northedge ................ | 73/861.04 |
| 4,930,353 A | 6/1990 | Kato et al. ................ | 73/727 |
| 4,958,938 A | 9/1990 | Schwartz et al. ......... | 374/208 |
| 4,970,898 A | 11/1990 | Walish et al. ............. | 73/706 |
| 4,980,675 A | 12/1990 | Meisenheimer, Jr. ..... | 340/626 |
| 5,000,047 A | 3/1991 | Kato et al. ................ | 73/706 |
| D317,266 S | 6/1991 | Broden et al. ............. | D10/46 |
| D317,269 S | 6/1991 | Selg ........................... | D10/52 |
| D318,432 S | 7/1991 | Broden et al. ............. | D10/46 |
| 5,028,746 A | 7/1991 | Petrich ...................... | 191/12.2 R |
| 5,035,140 A | 7/1991 | Daniels et al. ............ | 73/290 |
| 5,051,937 A * | 9/1991 | Kawate et al. ............ | 702/104 |
| 5,058,437 A | 10/1991 | Chaumont et al. ....... | 73/861.21 |
| 5,060,108 A | 10/1991 | Baker et al. .............. | 361/283 |
| 5,070,732 A | 12/1991 | Duncan et al. ............ | 73/431 |
| 5,083,091 A | 1/1992 | Frick et al. ................ | 324/678 |
| 5,087,871 A | 2/1992 | Losel ......................... | 323/299 |
| 5,094,109 A | 3/1992 | Dean et al. ................ | 73/718 |
| D329,619 S | 9/1992 | Cartwright ................. | D10/52 |
| 5,142,914 A | 9/1992 | Kusakabe et al. ......... | 73/723 |
| 5,157,972 A | 10/1992 | Broden et al. ............. | 73/718 |
| 5,162,725 A | 11/1992 | Hodson et al. ............ | 324/115 |
| 5,187,474 A | 2/1993 | Kielb et al. ................ | 340/870.18 |
| 5,212,645 A | 5/1993 | Wildes et al. ............. | 364/463 |
| 5,227,782 A | 7/1993 | Nelson ...................... | 340/870.1 |
| 5,236,202 A | 8/1993 | Krouth et al. ............. | 277/164 |
| 5,245,333 A | 9/1993 | Anderson et al. ......... | 340/870.3 |
| 5,248,167 A | 9/1993 | Petrich et al. ............. | 285/23 |
| D342,456 S | 12/1993 | Miller et al. .............. | D10/60 |
| 5,276,631 A * | 1/1994 | Popovic et al. ............ | 702/104 |
| 5,287,746 A | 2/1994 | Broden ...................... | 73/706 |
| 5,353,200 A | 10/1994 | Bodin et al. ............... | 361/816 |
| 5,369,386 A | 11/1994 | Alden et al. ............... | 335/206 |
| 5,377,547 A | 1/1995 | Kusakabe et al. ......... | 73/723 |
| 5,381,355 A | 1/1995 | Birangi et al. ............ | 364/724.01 |
| D358,784 S | 5/1995 | Templin, Jr. et al. ..... | D10/96 |
| 5,436,824 A | 7/1995 | Royner et al. ............. | 363/89 |
| 5,448,180 A | 9/1995 | Kienzler et al. ........... | 326/15 |
| 5,469,150 A | 11/1995 | Sitte .......................... | 340/825.07 |
| 5,471,885 A | 12/1995 | Wagner ..................... | 73/862.041 |
| D366,000 S | 1/1996 | Karas et al. ............... | D10/60 |
| D366,218 S | 1/1996 | Price et al. ................. | D10/52 |
| 5,495,768 A | 3/1996 | Louwagie et al. ......... | 73/706 |
| 5,498,079 A | 3/1996 | Price ......................... | 374/208 |
| 5,502,659 A * | 3/1996 | Braster et al. ............. | 702/104 |
| 5,524,333 A | 6/1996 | Hogue et al. .............. | 29/595 |
| 5,524,492 A | 6/1996 | Frick et al. ................ | 73/706 |
| 5,546,804 A | 8/1996 | Johnson et al. ............ | 73/431 |
| 5,600,782 A | 2/1997 | Thomson ................... | 395/182.02 |
| 5,606,513 A | 2/1997 | Louwagie et al. ......... | 364/510 |
| 5,650,936 A | 7/1997 | Loucks et al. ............. | 364/483 |
| 5,656,782 A | 8/1997 | Powell, II et al. ......... | 73/756 |
| 5,665,899 A | 9/1997 | Wilcox ...................... | 73/1.63 |
| 5,668,322 A | 9/1997 | Broden ...................... | 73/756 |
| 5,669,713 A * | 9/1997 | Schwartz et al. .......... | 374/1 |
| 5,670,722 A | 9/1997 | Moser et al. ............... | 73/756 |
| 5,677,476 A * | 10/1997 | McCarthy et al. ......... | 73/29.01 |
| 5,710,552 A | 1/1998 | McCoy et al. ............. | 340/870.21 |
| 5,754,596 A | 5/1998 | Bischoff et al. ........... | 375/295 |
| 5,764,928 A | 6/1998 | Lancott ..................... | 395/285 |
| 5,823,228 A | 10/1998 | Chou ......................... | 137/597 |
| 5,870,695 A | 2/1999 | Brown et al. .............. | 702/138 |
| 5,899,962 A | 5/1999 | Louwagie et al. ......... | 702/138 |
| 5,920,016 A | 7/1999 | Broden ...................... | 73/756 |
| 5,948,988 A | 9/1999 | Bodin ........................ | 73/706 |
| 5,954,526 A | 9/1999 | Smith ........................ | 439/136 |
| 5,955,684 A | 9/1999 | Gravel et al. .............. | 73/866.5 |
| 5,973,942 A | 10/1999 | Nelson et al. .............. | 363/21 |
| 5,988,203 A | 11/1999 | Hutton ...................... | 137/597 |
| 6,005,500 A | 12/1999 | Gaboury et al. ........... | 341/43 |
| 6,006,338 A * | 12/1999 | Longsdorf et al. ......... | 713/340 |
| 6,038,927 A | 3/2000 | Karas ........................ | 73/706 |
| 6,050,145 A | 4/2000 | Olson et al. ............... | 73/706 |
| 6,059,254 A | 5/2000 | Sundet et al. .............. | 248/678 |
| 6,105,437 A | 8/2000 | Klug et al. ................. | 73/756 |
| 6,111,888 A | 8/2000 | Green et al. ............... | 370/461 |
| 6,115,831 A | 9/2000 | Hanf et al. ................. | 714/43 |
| 6,123,585 A | 9/2000 | Hussong et al. ........... | 439/652 |
| 6,131,467 A * | 10/2000 | Miyano et al. ............. | 73/756 |
| 6,140,952 A * | 10/2000 | Gaboury .................... | 341/143 |
| 6,151,557 A * | 11/2000 | Broden et al. ............. | 702/47 |
| D439,177 S | 3/2001 | Fandrey et al. | |
| D439,178 S | 3/2001 | Fandrey et al. | |
| D439,179 S | 3/2001 | Fandrey et al. | |
| D439,180 S | 3/2001 | Fandrey et al. | |
| D439,181 S | 3/2001 | Fandrey et al. | |
| D441,672 S | 3/2001 | Fandrey et al. | |
| 6,216,172 B1 | 4/2001 | Koblin et al. .............. | 709/253 |
| 6,233,532 B1 | 5/2001 | Boudreau et al. ......... | 702/89 |
| 6,285,964 B1 | 9/2001 | Babel et al. ................ | 702/121 |
| 6,295,875 B1 * | 10/2001 | Freick et al. ............... | 73/718 |
| 6,311,568 B1 * | 11/2001 | Kleven ...................... | 73/861.42 |
| 6,321,166 B1 * | 11/2001 | Evans et al. ................ | 702/50 |

FOREIGN PATENT DOCUMENTS

| | | |
|---|---|---|
| DE | 299 03 560 u1 | 5/2000 |
| EP | 0 063 685 A1 | 11/1982 |
| EP | 0 167 941 A2 | 6/1985 |
| EP | 0 214 801 A1 | 3/1987 |
| EP | 0 223 300 A2 | 5/1987 |
| EP | 0 268 742 A1 | 7/1987 |
| EP | 639039 A1 | 2/1995 |
| EP | 0 903 651 A1 | 3/1999 |
| JP | 2000121470 | 10/1998 |
| WO | WO 88/01417 | 2/1988 |
| WO | WO 89/02578 | 3/1989 |
| WO | WO 89/04089 | 5/1989 |
| WO | WO 90/15975 | 12/1990 |
| WO | WO 91/18266 | 11/1991 |
| WO | WO 96/34264 | 10/1996 |
| WO | WO 98/48489 | 10/1998 |
| WO | WO 00/23776 | 4/2000 |

OTHER PUBLICATIONS

U.S. patent application Ser. No. 09/520,292, Davis et al., filed Mar. 7, 2000.

U.S. patent application Ser. No. 09/519,912, Nelson et al., filed Mar. 7, 2000.

U.S. patent application Ser. No. 09/672,338, Nelson et al., filed Sep. 28, 2000.

U.S. patent application Ser. No. 09/638,181, Roper et al., filed Jul. 31, 2000.

U.S. patent application Ser. No. 09/571,111, Westfield et al., filed May 15, 2000.

U.S. patent application Ser. No. 09/564,506, Nord et al., filed May 4, 2000.

U.S. patent application Ser. No. 09/667,289, Westfield et al., filed Sep. 22, 2000.

U.S. patent application Ser. No. 09/667,399, Behm et al., filed Sep. 21, 2000.

U.S. patent application Ser. No. 09/671,130, Fandrey et al., filed Sep. 27, 2000.

Product Data Sheet No: 00813–0100–4378, "Model 751 Field Signal Indicator", by Rosemount Inc., Eden Prairie, Minnesota, (1997).

Product Data Sheet No: 00813–0100–4731, "APEX™ Radar Gauge", by Rosemount Inc., Eden Prairie, Minnesota, (1998).

Product Data Sheet No: 00813–0100–4640, "Model 3201 Hydrostatic Interface Unit", from the Rosemount Comprehensive Product Catalog, published 1998, by Rosemount Inc., Eden Prairie, Minnesota.

Product Data Sheet No: 00813–0100–4003, "Model 8800A", by Rosemount Inc., Eden Prairie, Minnesota, (1998).

Product Data Sheet No: 00813–0100–4773, "Model 8742C—Magnetic Flowmeter Transmitter with Foundation™ Fieldbus", from the Rosemount Comprehensive Product Catalog, published 1998, by Rosemount Inc., Eden Prairie, Minnesota.

"Rosemount Model 8732C Magnetic Flowmeter Transmitter", by Rosemount Inc., Eden Prairie, Minnesota, (1998).

Product Data Sheet No: 00813–0100–4263, "Model 444 Alphaline® Temperature Transmitters", by Rosemount Inc., Eden Prairie, Minnesota, (1997).

Product Data Sheet No: 00813–0100–4769, "Model 3244MV Multivariable Temperature Transmitter with Foundation™ Fieldbus", by Rosemount Inc., Eden Prairie, Minnesota, (1998).

Product Data Sheet No: 00813–0100–4724, "Models 3144 and 3244MV Smart Temperature Transmitters", by Rosemount Inc., Eden Prairie, Minnesota, (1998).

Product Data Sheet No: 00813–0100–4738, "Model 3095FB Multivariable™ Transmitter with Modbus™ Protocol", by Rosemount Inc., Eden Prairie, Minnesota, (1996, 1997).

Product Data Sheet No: 00813–0100–4001, "Model 3501 Digital Pressure Transmitter for Pressure, Flow, and Level Measurement", by Rosemount Inc., Eden Prairie, Minnesota, (1998).

Product Data Sheet No: 00813–0100–4698, "Model 2090F Sanitary Pressure Transmitter", by Rosemount Inc., Eden Prairie, Minnesota, (1998).

Product Data Sheet No: 00813–0100–4690, "Model 2088 Economical Smart Pressure Transmitter", by Rosemount Inc., Eden Prairie, Minnesota, (1998).

Product Data Sheet No: 00813–0100–4592, "Model 2024 Differential Pressure Transmitter", by Rosemount Inc., Eden Prairie, Minnesota, (1987–1995).

Product Data Sheet No: 00813–0100–4360, "Model 1151 Alphaline® Pressure Transmitters", by Rosemount Inc., Eden Prairie, Minnesota, (1998).

Product Data Sheet No: 00813–0100–4458, "Model 1135F Pressure–to–Current Converter", by Rosemount Inc., Eden Prairie, Minnesota, (1983, 1986, 1994).

"Single Chip Senses Pressure and Temperature," *Machine Design*, 64 (1992) May 21, No. 10.

Brochure: "Reduce Unaccounted–For Natural Gas with High–Accuracy Pressure Transmitters," Rosemount Inc. Measurement Division, Eden Prairie, Minnesota, ADS 3073, 5/91, pp. 1–4.

Technical Information Bulletin, "Liquid Level Transmitter Model DB40RL Sanitary Sensor deltapilot," Endress + Hauser, Greenwood, Indiana, 9/92, pp. 1–8.

"The Digitisation of Field Instruments" W. Van Der Bijl, *Journal A*, vol. 32, No. 3, 1991, pp. 62–65.

Product Data Sheet PDS 4640, "Model 3201 Hydrostatic Interface Unit," Mar. 1992, Rosemount Inc., Eden Prairie, MN 55344.

Product Data Sheet PDS 4638, "Model 3001CL FlushMount Hydrostatic Pressure Transmitter," Jul. 1992, Rosemount Inc., Eden Prairie, MN 55344.

"Flow Measurement," *Handbook of Fluid Dynamics*, V. Streeter, Editor–in–chief, published by McGraw–Hill Book Company, Inc. 1961, pp. 14–4 to 14–15.

"Pressure Sensors Gauge Tank Level and Fluid Density," *Rosemount Measurement Division Product Feature*, undated reprint from *Prepared Foods* (Copyrighted 1991 by Gorman Publishing Company).

"Low Cost Electronic Flow Measurement System," *Tech Profile*, May 1993, Gas Research Institute, Chicago, IL.

"Development of an Integrated EFM Device for Orifice Meter Custody Transfer Applications," S.D. Nieberle et al., *American Gas Association Distribution/Transmission Conference & Exhibit*, May 19, 1993.

Advertisement, Model 3508 DP Transmitter, *Control Engineering*, Dec. 1992, Bristol Babcock, Inc., Watertown, CT 06795.

"Smart Transmitters Tear Up The Market," C. Polsonetti, *INTECH*, Jul. 1993, pp. 42–45.

American National Standard , "Hydraulic Fluid Power–Solenoid Piloted Industrial Valves–Interface Dimensions for Electrical Connectors", National Fluid Power Association, Inc., 10 pages, (Aug. 1981).

"Bosch CAN Specification Version 2.0", by Robert Bosch GmbH, pp. 1–68 including pp. –1–and –2–, (Sep. 1991).

Product Data Sheet No. 00813–0100–4360, "Model 1151 Alphaline® Pressure Transmitters", by Rosemount Inc., (1997).

Product Data Sheet No. 00813–0100–4001, "Digital Pressure Transmitter for Pressure, Flow, and Level Measurement", by Rosemount Inc., (1998).

"Claudius Ptolemy (100?–170? AD)", *M&C News*, 7 pages, (Apr. 1994).

U.S. patent application Ser. No. 09/862,762, Wang, filed May 21, 2001.

U.S. patent application Ser. No. 09/867,961, Fandrey et al., filed May 30, 2001.

\* cited by examiner

SELECTABLE ON-OFF LOGIC MODES FOR A SENSOR MODULE

REFERENCE TO CO-PENDING APPLICATION

This application claims priority benefits from U.S. provisional patent application 60/156,369 entitled UNITIZED MODULARITY IN A PROCESS TRANSMITTER filed on Sep. 28, 1999, which is hereby incorporated by reference.

BACKGROUND OF THE INVENTION

The present invention relates to industrial processing plants. More particularly, the present invention relates to transmitters used to measure process variables in such plants.

Typically, a transmitter senses a characteristic, such as pressure, of a process fluid and then transmits an output proportional to the characteristic to a remote location over a plant communication bus. The plant communication bus typically uses a 4–20 mA analog current loop or a digitally encoded serial protocol such as HART or Fieldbus. Data, such as commands for alarms or setting span, zero, upper range level (URL), lower range level (LRL) setting, and the like can also be communicated to and from the transmitter via the plant communication bus using the digitally encoded protocol.

The transmitter has a housing with sealed flameproof compartments for use in process plants where flammable atmospheres may be present. The housing has an electronics compartment with a removable cover that seals and protects an embedded microprocessor, a sensor, and momentary "ON-OFF" type switches for span and zero (or URL and LRL) settings. The housing also has a field wiring compartment with a removable cover that protects and seals field wiring connections with the plant communication bus. Electrical connections between the electronics and field wiring compartments are made using bulky sealed electrical feedthroughs that ensure flameproofing between the compartments.

Also, in some fluid processing plants, there is existing electrical equipment, such as limit switches or controllers, that are not provided with a digitally encoded output such as HART or Fieldbus, but instead have only simple "ON-OFF" or switch type inputs or outputs. There is a desire to communicate these "ON-OFF" type inputs or outputs, if used, to the microprocessor in the sealed sensor module.

Feedthrough contacts needed to accommodate all of the "ON-OFF" inputs and "ON-OFF" outputs are bulky and would increase the transmitter housings to such a large size that the transmitter would become unreasonably heavy and expensive for many desired process applications.

SUMMARY OF THE INVENTION

A sensor module for use in a transmitter includes a logic circuit having a selectable first mode of operation in which the logic circuit generates ON-OFF logic levels on two logic level contacts on the sensor module, and having a selectable second mode of operation in which the logic circuit detects ON-OFF logic levels on the same two shared logic level contacts.

The sensor module has an outer module housing with an inlet adapted for fluid communication with a fluid, and an electrical feedthrough with contacts.

The sensor module also has a transducer circuit coupled to the logic circuit. The transducer circuit includes a regulator coupled to energization contacts, a sensor sensing a fluid characteristic, and a transceiver adapted to couple a serial representation of a sensed fluid characteristic to a serial output contact.

The logic circuit can be conveniently set to select either generating ON-OFF logic level outputs or detecting ON-OFF logic level inputs, depending on the needs of the application. The ON-OFF logic level inputs share contacts with the ON-OFF logic level outputs and the use of additional dedicated feedthrough contacts for the logic level outputs is avoided.

DETAILED DESCRIPTION OF THE ILLUSTRATED EMBODIMENTS

In the present invention, a sensor module for a transmitter is improved to includes two multifunction shared logic contacts. The two multifunction contacts can be electrically set or selected to accommodate logic level "ON-OFF" type inputs, or "ON-OFF" type outputs, depending on the needs of the application. The logic level contacts can be connected directly to controllers, level switches or other plant equipment. In some applications, the same two contacts can also be used for setting span and zero or upper range level and lower range level settings for the transmitter.

The contacts are shared by the multiple functions, avoiding the need to incur additional cost, size, and weight using a connector with separate bulky feedthrough contacts for each function. The protocol on the logic level contacts is simply ON or OFF, without serial encoding, so that it is easy to set and connect to either inputs or outputs of electrical equipment from many different manufacturers without the concerns about protocol and timing compatibility typical to serially encoded lines.

As explained in more detail below, these two logic level contacts can be set or selected to operate as either input or output functions to meet the particular needs of an application. Setting or selection of the logic level contacts can be done by a technician when the sensor module is installed in a process plant installation. The technician applies a selection signal to an I/O contact on the sensor module which selects a desired input or output function for the logic contacts.

Figure 1:
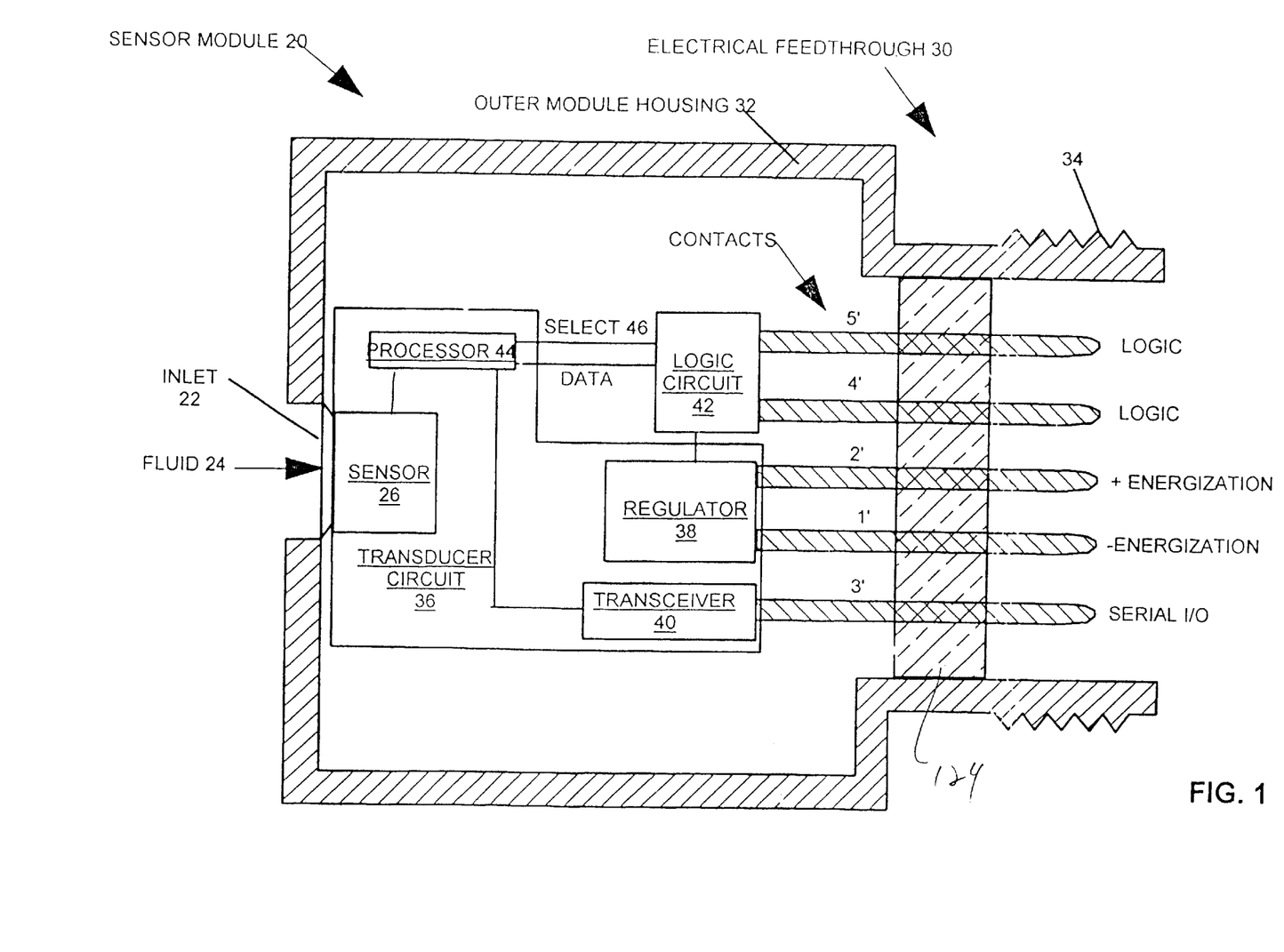
FIG. 1 illustrates a block diagram of a sensor module.

In FIG. 1, a block diagram of a such a sensor module 20 is illustrated. Sensor module 20 includes an outer module housing 32 having a fluid inlet 22 adapted for communicating a process fluid 24 to a sensor 26 within the sensor module 20. Sensor module 20 has a sealed electrical feedthrough 30 that includes energization contacts 1', 2', a serial input/output contact 3', and ON-OFF logic contacts 4', 5' that are settable to be either inputs or outputs. Electrical feedthrough 30 includes a threaded connector body or shell 34 that is an integral extension of module housing 32 and is adapted to electrically connect to, seal to and mechanically support a modular feature module 102 shown in FIG. 2. Feedthrough 30 seals contacts 1', 2', 3', 4', 5' in a block 124 of insulating glass or ceramic. The sensor module 20 and the feature module 102, when assembled together, form a improved modular transmitter 106 of FIG. 2 that includes ON-OFF logic contacts 4', 5' that can be selected to be either inputs or outputs, depending on the needs of the application.

A transducer circuit 36 located in housing 32 includes a processor 44 coupled to sensor 26, a transceiver 40 coupled to serial input/output contact 3' and a regulator 38 coupled to energization contacts 1' and 2'. Regulator 38 is used to provide power to circuitry in housing 32. A logic circuit 42 couples to ON-OFF logic contacts 4' and 5' and microprocessor 44.

Serial contact 3' is used by sensor module 20 for data communication. In accordance with one aspect, logic circuit 42 can selectively operate in a first mode of operation in which the logic circuit generates ON-OFF logic levels outputs on contacts 4' and 5' and in a second mode of operation in which logic circuit 42 detects ON-OFF logic levels which are carried on contacts 4' and 5'.

Figure 2:
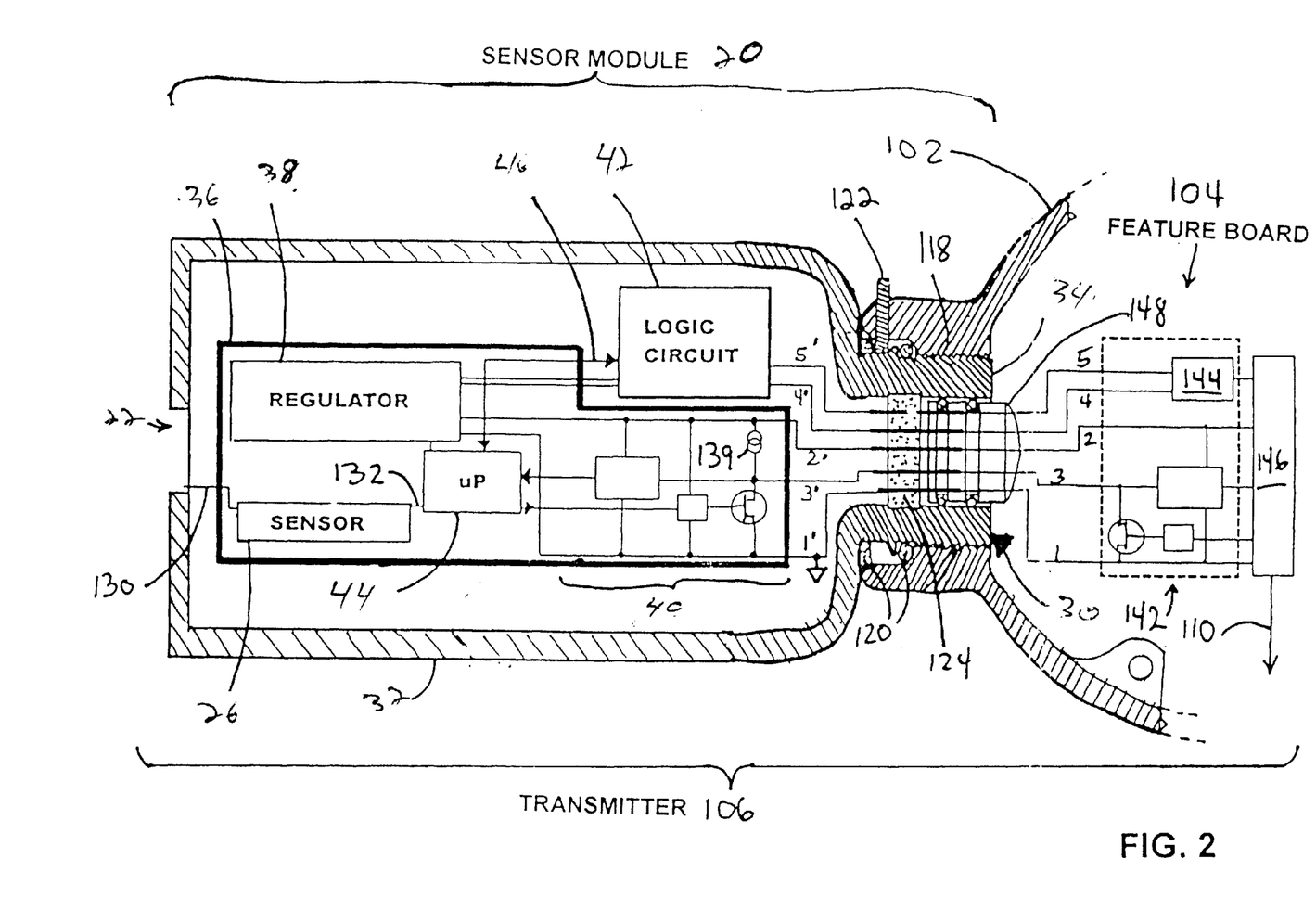
FIG. 2 schematically illustrates a transmitter including a sensor module and a feature module.

The energization contacts 1' and 2' and the serial I/O contacts 3' can be connected to a feature module 102 illustrated in FIG. 2 to form a functional transmitter that provides an output of the type used to control or monitor a process in a process control system. ON-OFF logic level contacts 4' and 5' provide additional functionality and can be used to selectively provide inputs or outputs to other plant equipment without requiring a large number of additional contacts through electrical feedthrough 30.

For example, the logic level contacts 4' and 5' can provide ON-OFF outputs to the logic inputs of a nearby controller. In such an arrangement, the logic level contacts 4' and 5' can provide indications to the controller indicative of whether the sensed fluid property is above or below preselected levels. The controller can, in turn, control valves, motors, pumps or other equipment in the process plant based upon the logic level output.

In another example, the logic level contacts 4' and 5'can be selected to be ON-OFF inputs to the sensor module 20. In such a mode of operation, contacts 4' and 5' can be coupled to logic level outputs from a nearby controller. In such an arrangement, the contacts 4' and 5' can be used to receive commands from the controller. Example commands include a range adjustment, instructions to initiate software diagnostics, or instructions to adjust the sampling time of the transmitter circuitry.

The description "logic level" as used herein refers to signals, contacts and the like that are either ON (logical high, a logical "1") or logical OFF (logical low, logical "0") and are stable for an extended period of time. The information or meaning in such "logic level" signals is represented by whether a simple high or low signal is present, rather than by a serially encoded sequence of pulses of ones and zeros of short duration as in serial communication.

In FIG. 2, further sensor module 20 is illustrated assembled with a wiring housing 102 and feature board 104 (shown partially). When assembled, sensor module 20 and wiring housing 102 and feature board 104 together form one example combination for a modular transmitter 106. Transmitter 106 generates a transmitter output at 110 that can be conveniently coupled to one or more of the process control buses discussed above. Transmitter output 110 represents a property or characteristic of the process fluid sample and can also transmit and receive other data as well.

Inlet 22 of outer module housing 32, which is illustrated schematically, can be threaded to receive a pipe fitting, a threaded coplanar flange, a flange secured by threaded nuts and bolts or other known types of process fluid inlets secured by threads. Inlet 22 can also be configured to include multiple inlets for more than one kind of process variable, for example a pressure sensing inlet and a flow sensing inlet. Feedthrough 30 mates with a corresponding internally threaded hub 118 of wiring housing 102. The joint between the threaded shell 34 and the threaded hub 118 is provided with seals 120 and setscrew 122 so that the sensor module 20, which is sealed, seals and secures the opening in threaded hub 118.

Contacts 1', 2', 3', 4' and 5' connect sensor module 20 to correspondingly numbered contacts 1, 2, 3, 4, 5 on the feature board 104, to complete internal transmitter circuitry. The contacts can be pins as illustrated, or sockets, depending on the needs of the application. Contacts numbered 1, 1', 2, 2' are energization contacts that couple energization to the sensor module 20. The contacts numbered 3, 3' are bidirectional serial output contacts that couple serial information between circuitry in the sensor module 20 (or two sensor modules) and the feature board 104.

The two logic level contacts numbered 4, 4', 5, 5' are provided that communicate logic levels between the circuitry in the sensor module 20 and the feature board 104. Sensor 26 senses one or more characteristics or properties of the fluid at inlet 22 and generates a sensed representation of fluid property on line 132. Sensor 26 can include, for example, a pressure sensor, a temperature sensor, a flow sensor, a pH sensor or any known type of sensor or sensors. Regulator 38 draws only a limited amount of power from the feature board 104 so that the feature board 104 operates within the power limitations of the plant bus 110, which is typically a 4–20 mA loop. Regulator 38 provides regulated power supply levels to the transducer circuit 36 and the logic circuit 42 in the sensor module 20.

Processor 44 receives sensed fluid characteristic values from sensor 26 and provides the values to a transceiver 138. Sensor 26 is preferably a capacitive sensor to provide high accuracy and rangeability. Processor 44 can include a delta sigma switched capacitance application specific integrated circuit (ASIC) for providing a high resolution representation of the output of sensor 26. Processor 44 can comprise an arithmetic-logic unit, various types of memory, an operating program, a processor bus, input/output circuits and the like. Transceiver 40 is adapted to couple a serial representation of the sensed fluid property to the serial output contact 3 via contact 3.

The processor 44 controls, selects or sets the mode of operation of the logic circuit 42. The logic circuit 42 is selectable to a first mode of operation in which the logic circuit 42 generates logic levels on the logic level contacts 4', 5'. The logic circuit 42 is settable to an alternate second mode of operation in which the logic circuit 42 detects logic levels on the logic level contacts 4', 5'. The setting or selecting of the mode of operation of the logic circuit can be programmed from the feature board by a serial signal or other detectable signal that the feature board applies through contact 3', typically as part of a power start up routine when the bus 110 is energized after a period of being de-energized. Alternatively, the setting of the mode of operation of the logic circuit can also be programmed by the sensor module 20 itself when it detects or senses the presence of a diode in a feature board connected to contacts 3, 4, as explained more fully in connection with FIG. 4 below.

As suggested above, the sensor module 20 can be any one of a family of sensor modules that sense pressure, temperature, flow, pH or other fluid properties, providing a selection of sensor module types with electrically, mechanically and software compatible contacts 1', 2', 3', 4', 5' in feedthrough 30. A selected feature module 104 from a family of feature module types can be connected to the sensor module 20 to provide a modular system of constructing a process variable transmitter for fluid sensing applications. Feature modules or boards 104 can be selected from a group that includes boards that connect to various plant communication buses, boards that provide displays, and other types of boards. The logic levels on pins 4', 5' connected to contacts 4, 5 can be set to be either inputs or outputs of the sensor module 20, depending on the needs of the application, greatly extending the modularity and flexibility of the overall transmitter modularity system.

Before the transmitter 106 is placed into service, a technician sets the logic levels on pins 4', 5' to be inputs or outputs depending on the needs of the installation. Using the feature board 104 shown in FIG. 2, the technician provides setting commands (typically encoded as HART or Foundation Fieldbus signals) on the plant bus 110. The feature board 104 passes the setting commands on to sensor module 20 on the serial communication contact 3.

The typical feature board circuitry 104 shown in FIG. 2, which is not a part of the sensor module 20, includes transceiver circuitry 142, logic interface circuitry 144 and bus interface circuitry 146. The feature board connects to the contacts 1', 2', 3', 4', 5' via pins 1, 2, 3, 4, 5 secured to an electrical plug 148. There is no need for additional dedicated contacts for ON-OFF outputs because the contacts 4', 5' serve as both ON-OFF inputs and ON-OFF outputs in two different selectable modes of operation.

In some applications, two sensor modules such as module 20 may be locally interconnected (not illustrated) and used together with the corresponding two sensor module contacts 3', 3' connected to one another for serial communication between the two sensor modules 100. For example, a differential pressure sensor module on an orifice flow meter on a liquid line and a temperature sensor module on the liquid line can be interconnected to provide a temperature corrected indication of liquid flow rate.

Figure 3:
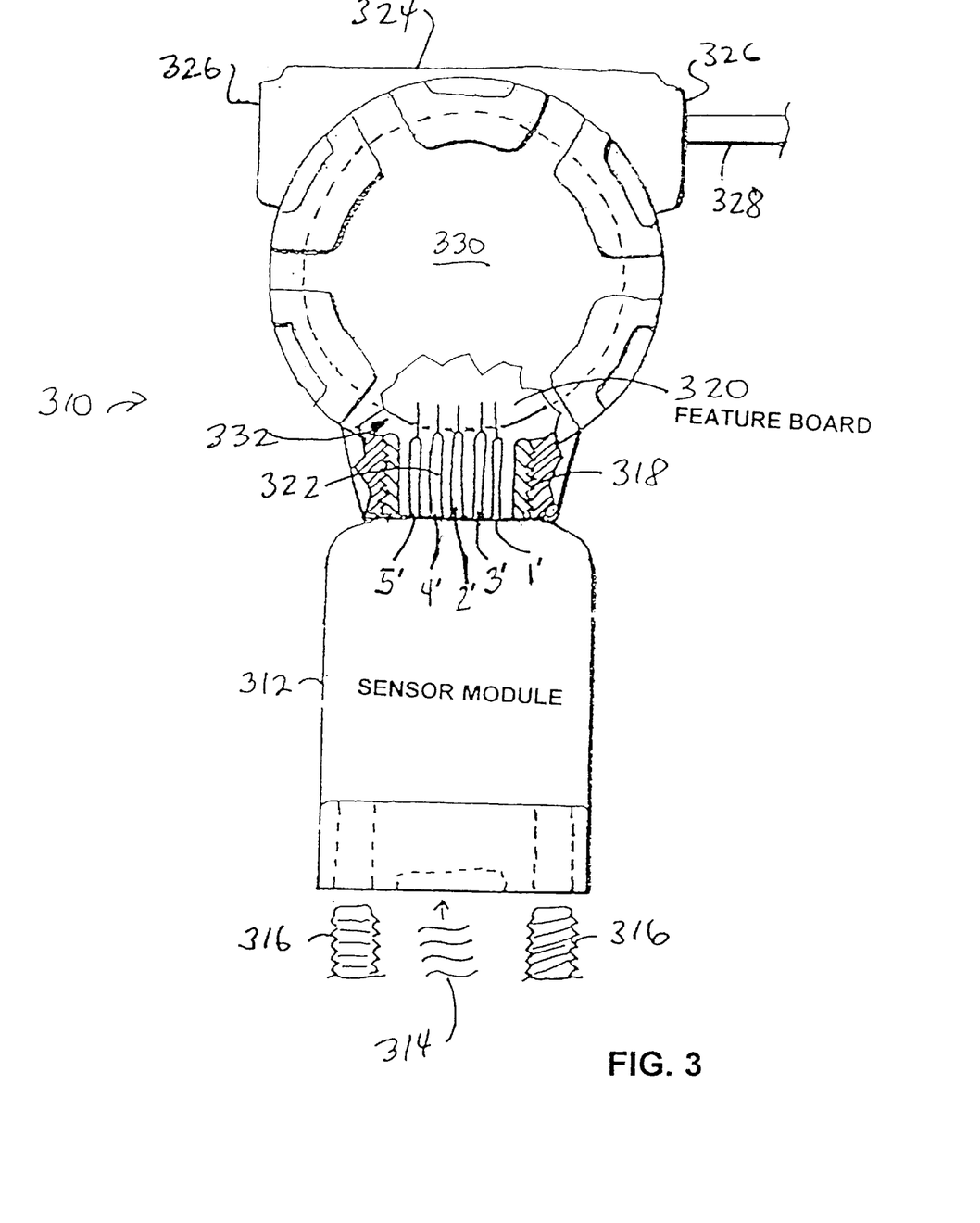
FIG. 3 illustrates a transmitter that senses pressure.

FIG. 3 shows an example pressure transmitter 310 and illustrates another example sensor module 312 that senses differential pressure from fluids 314. Sensor module 312 is mounted by bolts 316 that attach module 312 to a standard differential pressure process flange (not shown). Sensor module 312 includes contacts 1', 2', 3', 4', 5' that are accessible on sealed feedthrough pins 322 in a threaded connector shell 318. Contacts 4', 5' are logic level contacts and sensor 312 can selectively operate in a first mode in which logic levels are generated on the contacts 4', 5' or can selectively operate in a second mode in which the sensor module detects logic levels on the contacts 4', 5'. Contacts 1', 2', 3', 4', 5' connect to a feature board 320 in cavity 332. Feature board 320 connects to a plant bus 328. The feature board is enclosed in a housing 324 that includes a threaded cover 330. The housing 324 has electrical conduit entries 326 for receiving the plant bus 328. Various types of feature boards 320 can be made to meet the interface requirements of various types of plant buses or to provide a local display, without the need to vary the standardized configuration of the logic level contacts, which operate separately from the plant bus.

Figure 4:
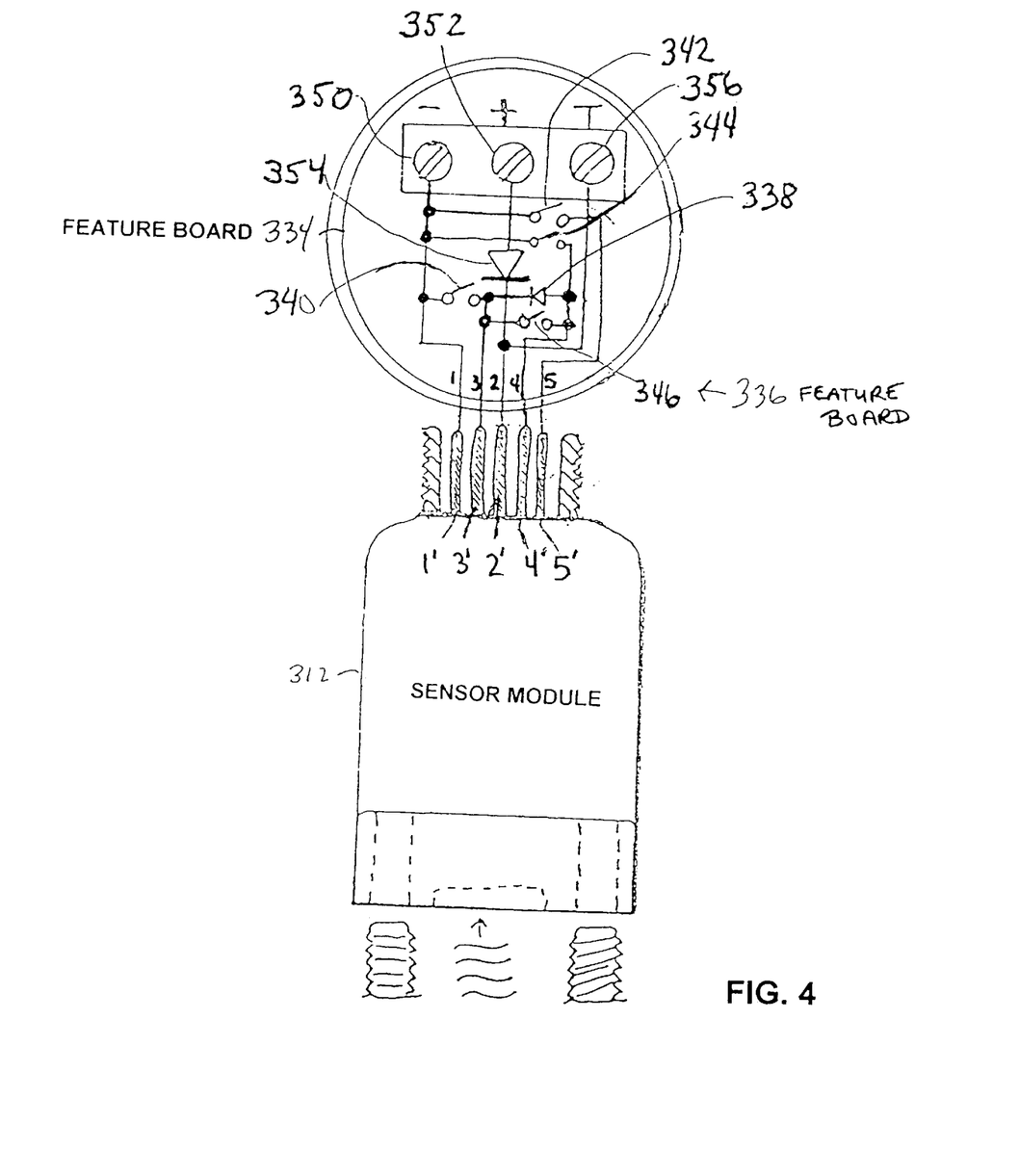
FIG. 4 illustrates a pressure transmitter circuit including switches providing ON-OFF type data.

In FIG. 4, the electrical wiring of one type of feature board 336 is shown in more detail. The sensor module 312 in FIG. 4 includes contacts 1, 2, 3, 4, 5 as explained above. A plant bus in the form of a 4–20 mA circuit is connected to terminals 350, 352. Terminal 350 connects the (−) side of the plant bus to contact 1 for energization. Terminal 352 connects the (+) side of the plant bus to contact 2 for energization via a diode 354. An additional terminal 356 is provided so that a technician can connect an ammeter across diode 354 to measure loop current during calibration, if desired. Logic level contact 4 is connected to a switch 344. When switch 344 is closed by a technician, it connects logic level contact 4 to the (−) energization contact 1. Logic level contact 5 is connected to a switch 342. When switch 342 is closed by a technician, it connects logic level contact 5 to the (−) energization contact 1.

A signal diode 338 is connected between serial output contact 3 and logic level contact 4. When transceiver circuit 40 transmits one or more pulses at initial power up, the signal diode 338 conducts these pulses to logic level contact 4. A current source 139 in the transceiver 40 provides a pull-up current for this transmission. The presence of these pulses on contact 4 is sensed by the logic circuit 42 (FIG. 2) in the sensor module 312. The signal diode 338 is thus used to identify this particular type of feature board to the sensor module 312. When the signal diode 338 is detected, then the logic circuit is set to the second mode in which it detects logic levels. Contacts 4 and 5 can thus be conveniently used to set span and zero or URL and LRL with the switches 342, 344 in this particular type of feature board.

Feature board 336 further includes switches 340 and 346 which a technician can actuate to provide two additional logic level inputs. Switch 340 connects between serial contact 3 and the (−) contact 1. Switch 346 connects between serial contact 3 and the logic contact 4. With this feature board, the serial output is not used to communicate serial data, but is instead used to detect simple ON OFF logic levels from switches 340, 346. A total of 4 logic level inputs can thus be detected by the sensor module with this particular feature board. No additional sealed feedthrough contacts are needed to detect the multiple ON OFF logic level inputs from switches 340, 342, 344 and 346.

Figure 5:
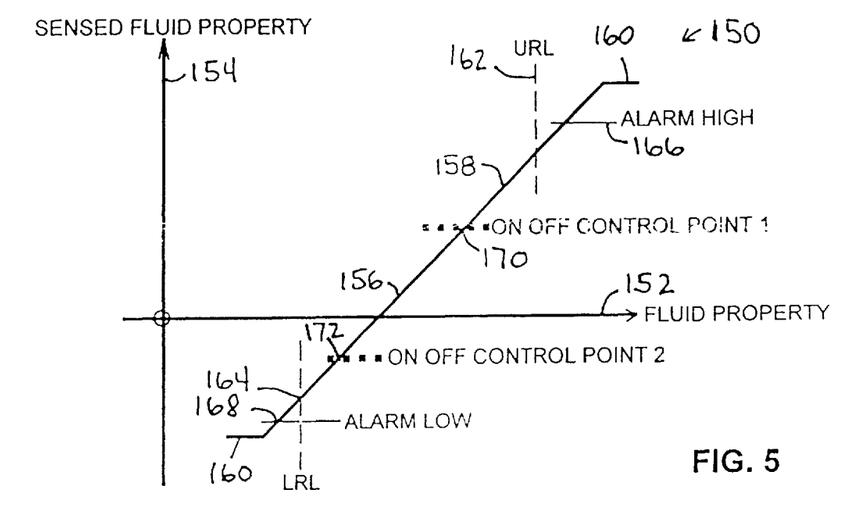
FIG. 5 graphically illustration a sensed value of a fluid property or characteristic as a function of the fluid property in relation to ON-OFF type values.

In FIG. 5, a graph illustrates features of the operation of the sensor module 20. The horizontal axis 152 represents magnitudes of the fluid property or characteristic present at the inlet 108 and on line 130 (FIG. 2). The vertical axis 154 represents magnitudes of the sensed fluid property at line 132 (FIG. 2). The line 156 represents variation of the sensed fluid property (an electrical parameter) as a function of the fluid property (a physical property). The function has a generally linear or monotonic useful central defined range 158 and also overdriven or saturated ranges 160. The defined range 158 extends from an upper range level (URL) at 162 to a lower range level (LRL) at 164.

When the logic circuit 42 (FIG. 2) is set to the first mode of operation, data is stored in processor 44 that corresponds to comparisons of the sensed fluid property to pre-selected set points stored in the processor 44 of the transducer circuit 36. In this mode, the logic circuit 42 generates logic level outputs on contacts 4,5 that indicate whether these set points have been exceeded. The set points can be selected by the user.

When the logic circuit 140 (FIG. 2) is set to the first mode of operation, data is stored in processor 136 that corresponds to comparisons of the sensed fluid property to pre-selected set points stored in the processor 136 of the transducer circuit 126. In this mode, the logic circuit 140 generates logic level outputs on contacts 4,5 that indicate whether these set points have been exceeded. The set points can be selected by the user.

For example, when pre-selected set points 166 ALARM HIGH and 168 ALARM LOW are outside the defined sensor range 158, then corresponding logic levels on contacts 4', 5' represents alarm conditions in the process plant. In a case where transmitter 106 is used to sense level of fluid in a tank, for example, set point 166 ALARM HIGH would be used to indicate that the tank is overfilled, and a tank drain valve would be opened when ALARM HIGH is true. Correspondingly, ALARM LOW would indicate that the tank is under-filled and a pump would be started to refill the tank.

In a case where pre-selected set point 170 ON OFF CONTROL POINT 1 and set point 172 CONTROL POINT 2 are within the defined sensor range, the corresponding logic level represents an ON-OFF control output. Set points 170, 172 can represent temperature levels in a temperature transmitter that are used to initiate operation of first and second stage burners as needed to keep the temperature of an oven in a desired or regulation range.

When logic circuit 42 is set to a second mode of operation, however, logic circuit 42 detects or senses logic levels on contacts 4', 5'. The detected logic levels can set the defined sensor range 158 between upper range level 162 and lower range level 164 as part of a calibration or ranging process performed by a technician actuating switches connected to contacts 4', 5'. For example, if a technician desired to set the defined range 158 of a temperature transmitter from minus 5 degrees Centigrade to plus 50 degrees Centigrade, the technician would apply a fluid input at minus 5 degrees Centigrade, wait for the temperature to stabilize and then actuate a switch connected to contact 4 to provide a logic level signal to the sensor module 20 that sets the lower range level to the current temperature, minus 5 degrees Centigrade. Next, the technician would apply a fluid input at a plus 50 degrees Centigrade temperature, wait for the temperature to stabilize and then actuate a switch connected to contact 5 to provide a logic level signal to the sensor module 20 that sets the upper range level to the current temperature, plus 50 degrees Centigrade.

While the above example illustrates setting upper range levels and lower range levels in a temperature transmitter, it will understood by those skilled in the art that this type of calibration is applicable to transmitters sensing a variety of fluid properties or characteristics and that, rather than upper range level and lower range level settings, settings of span and zero values could also be used.

Figure 6:
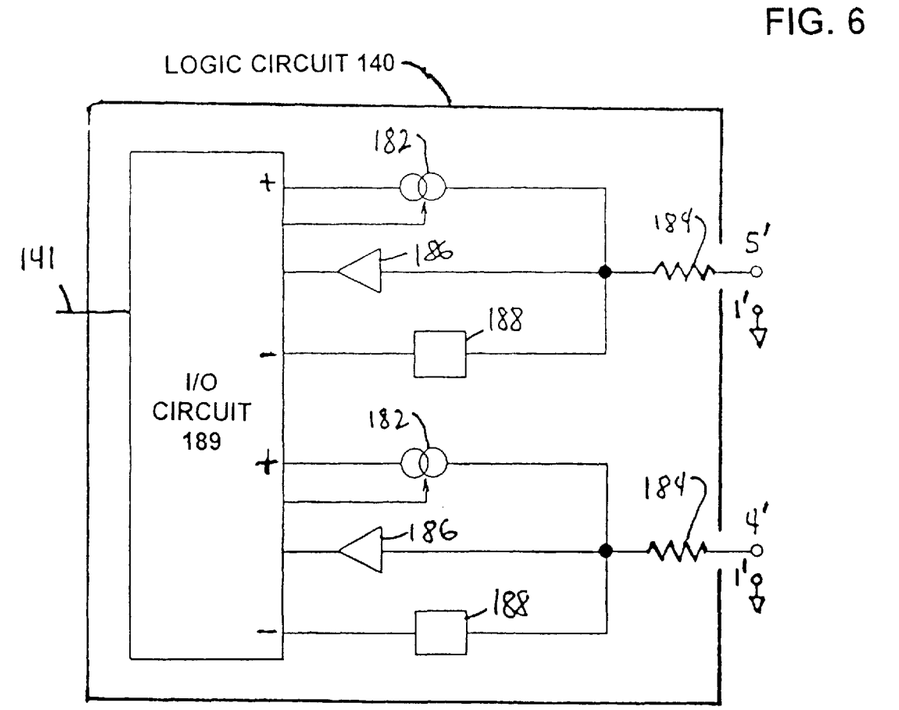
FIG. 6 is an electrical diagram of a logic circuit handling ON-OFF type levels.

In FIG. 6, a logic circuit 140 which can be used as logic circuit 42 in FIGS. 1 and 2 is illustrated connected to contacts 4', 5'. Contact 1' provides a DC common or return connection for the logic circuit 42. A programmable input/output circuit 189 in logic circuit 42 couples the circuitry 182, 184, 186, 188 in logic circuit 42 to the processor 44 (FIG. 2) via line 141. The portion of the logic circuit connected to contact 4' is similar to the portion of the logic circuit connected to contact 5' and the same reference numbers are used in both portions of the circuit to identify similar features. A controlled current source 182 couples to contact 4', through resistor 184 and provides a controlled current to contact 4'. In the first mode of operation, when contact 4' is a logic level output of the sensor module 20, the controlled current source is controlled to generate either a substantially zero current level (logical 0) or a non-zero fixed amount of current $I_0$ that represents a logical 1. Current source 182 couples to a potential in input/output circuit 189 for energization. It will be understood by those skilled in the art that current source 182 has a compliance range, and that when contact 5' is not used in a field application and left unconnected, then current source 182 does not waste current because it is outside of its range of compliance when left disconnected.

level detector 186 is also coupled to contact 4'. Level detector 186 can be a digital buffer or logic gate, latch or comparator. Level detector 186 detects the logic level on contact 4' and couples the level data to input/output circuit 189 which, in turn, interfaces with processor 44 (FIG. 2) via line 141.

A suppressor 188 is also coupled to contact 4'. Suppressor 188 can be a diode, a Zener diode, a varistor or other suppressor device used to protect the circuitry connected to contact 4' from damage due to high voltage.

In field applications where contact 4 is connected to existing electrical equipment in the plant, there is a risk that high voltage spikes will occasionally be present on contact 4. The resistance of resistor 184 preferably has a positive temperature coefficient of resistance. When higher than normal voltages are applied to contact 4, a large current flows through the resistor 184 and the suppressor device 188, causing the resistor 184 to heat up. As the temperature of resistor 184 increases, its resistance also increases due to the positive temperature coefficient. The increased resistance provides better protection at higher levels of excessive voltage. In a preferred embodiment, the resistors are formed of a resistance element that comprises tantalum, which has a high melting point, reducing the possibility of melting and shorting out of the resistance element during a high electrostatic discharge. Resistors formed of other materials with similar properties can also be used.

The resistance of resistor 184 is high enough to provide protection from higher voltage, but low enough so that it does not interfere with operation of the lower voltage logic functions. Resistances on the order of about 10–100 ohms at room temperature are preferred.

Figure 7:
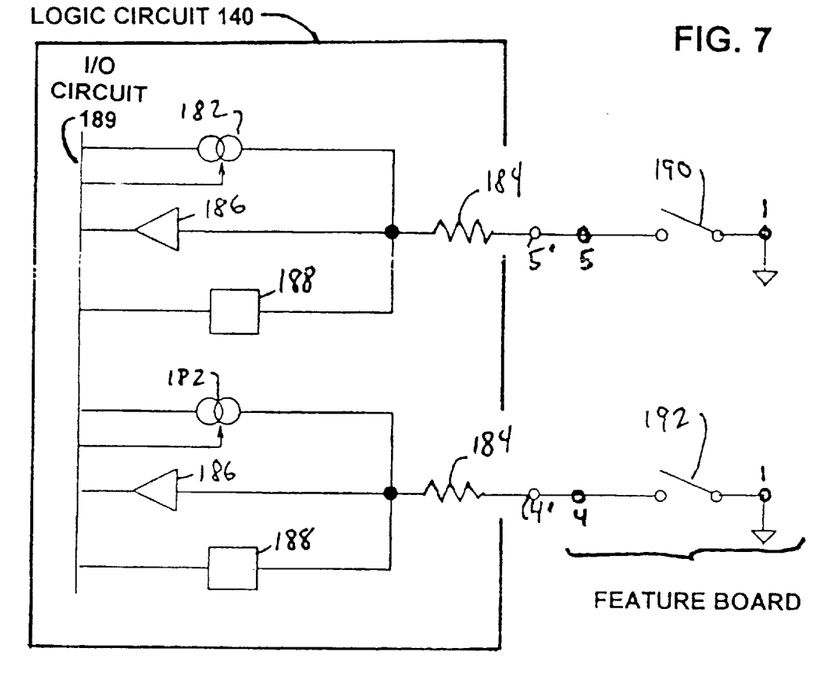
FIG. 7 is an electrical diagram of connections to a logic circuit useful in a selected mode of operation in which the logic circuit detects ON-OFF logic levels.

In FIG. 7, a logic circuit similar to that shown in FIG. 6 is illustrated connected to switches 190, 192. The logic levels on contacts 4', 5' have been programmed to operate as logic level inputs. The current sources 182 provide current in this mode. When either switch 190 or 192 is open, then the corresponding contact 5' or 4' is at a high logic level. Conversely, when either switch 190, 192 is closed, then the corresponding contact 5' or 4' is at a low logic level. The switches 190, 192, which can be mechanical or solid state, provide logic level data to the sensor module. The switches 190, 192 are located outside the sensor module 20, which is sealed, and are typically located in a feature module 104 as illustrated in FIG. 4.

Figure 8:
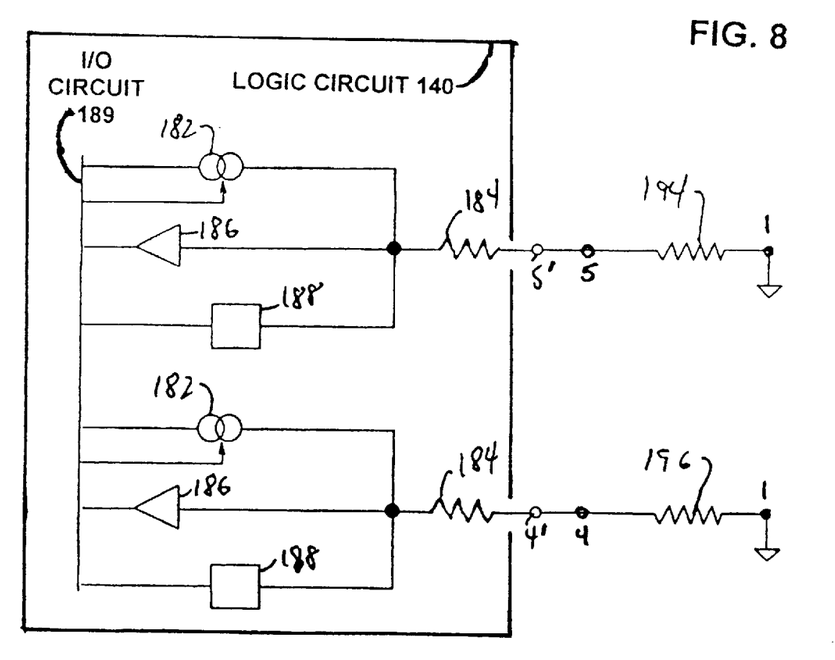
FIG. 8 is an electrical diagram of connections to a logic circuit useful in a selected mode of operation in which the logic circuit generates ON-OFF logic levels.

FIG. 8 shows a logic circuit, also similar to that shown in FIG. 6, illustrated connected to logic receivers 194, 196, represented by their equivalent resistances which are high compared to the resistances of resistors 184. The logic levels of contacts 4', 5' have been set or programmed to operate as logic level outputs. For a logical "one," currents from current sources 182 pass through the equivalent resistances of receivers 194, 196 and generates a voltage that can be sensed as a logic "one" output of the logic circuit. For logical "zeros," the controlled current sources are set to zero, or shut off. The use of a controlled current sources 182 has the advantage that a user can select a value for resistance 184 that adjusts the logic high output level to conveniently match that of connected equipment, so long as it is within the compliance range of the current sources 182. In some applications, the logic level receivers 194, 196 can be low power receivers such as liquid crystal displays or turbine meters in which the logic level currents from current sources 182 also serve as energization for the logic level receiver itself.

As can be seen in FIGS. 7 and 8, the same set of contacts 4', 5' can be used as logic level inputs in one mode of operation, and also as logic level outputs in another mode of operation. There is no need to have separate feedthrough contacts for the logic level inputs and outputs.

In summary, a sensor module for a transmitter is provided that has five sealed feedthrough contacts, and two of these five contacts are arranged such that they are settable to a first mode of operation in which the sensor module generates logic levels, and are also settable to a second mode of operation in which the sensor module detects logic levels on the same contacts. The problem with an excessive number of contacts on the sensor module is avoided and the sensor module can be manufactured in a compact, low cost arrangement.

A computer readable medium having stored thereon instructions executable by an embedded controller in a sensor module to cause the sensor module to select a mode of operation for ON-OFF logic level contacts in a feedthrough formed in an outer module housing having an inlet adapted for connection to a fluid, the instructions comprising generating a serial representation of a characteristic of the fluid, selecting a first mode of operation in which a logic circuit generates ON-OFF logic levels on the logic level contacts, selecting a second mode of operation, as a alternate to the first mode of operation, in which the logic circuit detects ON-OFF logic levels on the logic level contacts.

What is claimed is:

1. A sensor module, comprising:
   an outer module housing having an inlet adapted for fluid communication with a fluid, and having an electrical feedthrough to provide energization contacts, a serial output contact and logic level contacts;
   a transducer circuit located within the module housing having a sensor for sensing a fluid characteristic, a regulator coupled to the energization contacts, and a transceiver adapted to couple a serial representation of the sensed fluid characteristic to the serial output contact; and
   a logic circuit coupled to the transducer circuit, wherein the logic circuit has a selectable first mode of operation in which the logic circuit generates ON-OFF logic levels on the logic level contacts, and a selectable second mode of operation in which the logic circuit detects ON-OFF logic levels on the logic level contacts.

2. The sensor module of claim 1 wherein the logic circuit is set to the first mode and the ON-OFF logic levels represent comparisons of the sensed fluid characteristic to pre-selected set points stored in the transducer circuit.

3. The sensor circuit of claim 2 wherein the sensor has a defined sensor range and at least one pre-selected set point is outside the defined sensor range and a corresponding ON-OFF logic level represents an alarm condition for the sensed fluid property.

4. The sensor circuit of claim 2 wherein the sensor has a defined sensor range and at least one preselected set point is within the defined sensor range and a corresponding ON-OFF logic level represents an ON-OFF control output.

5. The sensor module of claim 1 wherein the logic circuit is set to the second mode and the detected ONOFF logic levels set a defined sensor range in the transducer circuit.

6. The sensor module of claim 5 wherein the ON-OFF logic levels set a span value and a zero value for the defined sensor range.

7. The sensor module of claim 5 wherein the ON-OFF logic levels set an upper range level and a lower range level of the defined sensor range.

8. The sensor module of claim 1 wherein the logic circuit includes controlled current sources coupling to the logic level contacts.

9. The sensor module of claim 1 wherein the logic circuit includes level detectors detecting levels on the logic level contacts and coupling level data to the transducer circuit.

10. The sensor module of claim 1 wherein the logic circuit includes suppressor devices coupled to the logic level contacts.

11. The sensor module of claim 10 wherein the logic circuit includes resistances coupling the suppressor devices to the logic level contacts.

12. The sensor module of claim 11 wherein the resistances have a positive temperature coefficient of resistance.

13. The sensor module of claim 12 wherein the resistances comprise tantalum resistors.

14. The sensor module of claim 1 wherein the transducer circuit includes a delta sigma switched capacitance circuit.

15. A sensor module, comprising:
    an outer module housing having an inlet for receiving a fluid, and having a feedthrough with energization contacts, a serial output contact and logic level contacts;
    a transducer circuit having a regulator coupled to the energization contacts, having a sensor coupled to the inlet, and having a transceiver adapted to couple a serial representation of a sensed fluid characteristic to the serial output contact; and
    means coupled to the transducer circuit, the means being selectable to a first mode of operation. in which the means generates ON-OFF logic levels on the logic level contacts, and the means being selectable to a second mode of operation in which the means detects ON-OFF logic levels on the logic level contacts.

16. A method of providing selectable logic modes in a sensor module, comprising:
    providing energization contacts, a serial input/output contact and logic level contacts in an electrical feedthrough formed in an outer module housing having an inlet adapted for fluid communication with a fluid;
    installing a transducer circuit in the outer module housing, the transducer circuit having a regulator coupled to the energization contacts, having a sensor coupled to the inlet, and having a transceiver adapted to couple a serial representation of a sensed fluid characteristic to the serial input/output contact; and
    installing a logic circuit in the outer module housing, the logic circuit coupling to the transducer circuit and being selectable to a first mode of operation in which the logic circuit generates ON-OFF logic levels on the logic level contacts, and the logic circuit being selectable to a second mode of operation in which the logic circuit detects ON-OFF logic levels on the logic level contacts.

* * * * *

UNITED STATES PATENT AND TRADEMARK OFFICE
CERTIFICATE OF CORRECTION

PATENT NO.   : 6,484,107 B1  
DATED        : November 19, 2002  
INVENTOR(S)  : Weston Roper et al.

It is certified that error appears in the above-identified patent and that said Letters Patent is hereby corrected as shown below:

Column 8,  
Line 13, before "level" insert -- A --.

Column 10,  
Line 4, change "ONOFF" to -- ON-OFF --.

Signed and Sealed this

Twenty-eighth Day of October, 2003

JAMES E. ROGAN  
*Director of the United States Patent and Trademark Office*